United States Patent
Lohmar et al.

(10) Patent No.: US 10,321,199 B2
(45) Date of Patent: *Jun. 11, 2019

(54) STREAMING WITH OPTIONAL BROADCAST DELIVERY OF DATA SEGMENTS

(71) Applicant: Telefonaktiebolaget LM Ericsson (publ), Stockholm (SE)

(72) Inventors: Thorsten Lohmar, Aachen (DE); Daniel Catrein, Würselen (DE); Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,412

(22) Filed: Nov. 9, 2017

(65) Prior Publication Data
US 2018/0070149 A1 Mar. 8, 2018

Related U.S. Application Data

(63) Continuation of application No. 13/500,594, filed as application No. PCT/EP2009/064553 on Nov. 3, 2009, now Pat. No. 9,820,009.

(51) Int. Cl.
*H04H 60/32* (2008.01)
*H04N 21/6408* (2011.01)
(Continued)

(52) U.S. Cl.
CPC ..... *H04N 21/6408* (2013.01); *H04N 21/2407* (2013.01); *H04N 21/258* (2013.01);
(Continued)

(58) Field of Classification Search
CPC .......... H04N 21/6408; H04N 21/6405; H04N 21/6131; H04N 21/472; H04N 21/258; H04N 21/2407; H04N 21/41407
(Continued)

(56) References Cited

U.S. PATENT DOCUMENTS 7,222,185 B1 * 5/2007 Day ............ H04L 12/185
370/432
7,260,601 B1 * 8/2007 Day ............ H04H 20/42
370/236

(Continued)

FOREIGN PATENT DOCUMENTS

JP 2000181836 A 6/2000
JP 2003510734 A 3/2003
(Continued)

OTHER PUBLICATIONS

Pantos, R., "HTTP Live Streaming", Information Internet—Draft Intended Status: Informational, Oct. 5, 2009, pp. 1-20.
(Continued)

*Primary Examiner* — Michael B. Pierorazio
(74) *Attorney, Agent, or Firm* — Coats & Bennett, PLLC

(57) ABSTRACT

For streaming data in a mobile communication network, a descriptive file of a stream is provided. The descriptive file comprises a list of delivery source identifiers, e.g. URIs, for unicast delivery of data segments of the stream. A broadcast indicator is selectively added to the descriptive file so as to indicate whether broadcast delivery of the data segments is available. Adding the broadcast indicator and initiating the broadcast delivery may be accomplished on the basis of a popularity of the stream.

16 Claims, 6 Drawing Sheets

(51) Int. Cl.
　　　H04N 21/24　　　(2011.01)
　　　H04N 21/258　　(2011.01)
　　　H04N 21/414　　(2011.01)
　　　H04N 21/472　　(2011.01)
　　　H04N 21/61　　　(2011.01)
　　　H04N 21/6405　(2011.01)

(52) U.S. Cl.
　　　CPC ..... *H04N 21/41407* (2013.01); *H04N 21/472* (2013.01); *H04N 21/6131* (2013.01); *H04N 21/6405* (2013.01)

(58) Field of Classification Search
　　　USPC .......................................................... 725/14
　　　See application file for complete search history.

(56) References Cited

U.S. PATENT DOCUMENTS

| | | | |
|---|---|---|---|
| 7,672,280 B2 | 3/2010 | Shim et al. | |
| 7,996,553 B2* | 8/2011 | Keller | H04L 12/189 709/203 |
| 8,018,934 B2 | 9/2011 | Liu | |
| 8,099,473 B2 | 1/2012 | Biderman et al. | |
| 8,099,476 B2 | 1/2012 | Biderman et al. | |
| 8,411,129 B2* | 4/2013 | Satterlee | H04N 7/152 348/14.08 |
| 2006/0050672 A1* | 3/2006 | Shim | H04L 12/189 370/338 |
| 2006/0085553 A1* | 4/2006 | Rachwalski | G06F 17/30017 709/233 |
| 2007/0076728 A1* | 4/2007 | Rieger | H04L 41/0853 370/401 |
| 2007/0124756 A1* | 5/2007 | Covell | G06F 17/30743 725/18 |
| 2007/0133484 A1* | 6/2007 | Albal | H04W 72/005 370/338 |
| 2007/0220545 A1* | 9/2007 | Awano | H04H 20/28 725/34 |
| 2007/0298708 A1 | 12/2007 | Maggenti et al. | |
| 2008/0069071 A1* | 3/2008 | Tang | H04W 72/005 370/342 |
| 2008/0159186 A1* | 7/2008 | Steer | H04L 25/0202 370/297 |
| 2008/0159430 A1* | 7/2008 | Steer | H04L 27/3483 375/267 |
| 2008/0184087 A1* | 7/2008 | Hayashi | H04L 1/1812 714/751 |
| 2008/0285578 A1* | 11/2008 | DeLay | G06F 9/546 370/412 |
| 2009/0025027 A1* | 1/2009 | Craner | H04H 20/103 725/32 |
| 2009/0059832 A1* | 3/2009 | Jhamnani | H04W 72/005 370/312 |
| 2009/0073911 A1* | 3/2009 | Cheon | H04L 1/0015 370/312 |
| 2009/0165056 A1* | 6/2009 | Sparrell | H04N 7/17318 725/58 |
| 2009/0247208 A1* | 10/2009 | Lohmar | H04L 12/189 455/519 |
| 2009/0320084 A1* | 12/2009 | Azam | H04N 7/17318 725/120 |
| 2009/0328115 A1* | 12/2009 | Malik | H04N 7/17318 725/93 |
| 2010/0031296 A1* | 2/2010 | Elias | H04N 7/17318 725/54 |
| 2010/0058405 A1* | 3/2010 | Ramakrishnan | H04N 7/17318 725/97 |
| 2010/0076909 A1* | 3/2010 | Suri | G06Q 10/10 706/11 |
| 2010/0125887 A1* | 5/2010 | Evans | G06Q 10/06 725/114 |
| 2010/0165902 A1* | 7/2010 | Kvernvik | H04L 12/189 370/312 |
| 2010/0169453 A1 | 7/2010 | Biderman et al. | |
| 2010/0169459 A1* | 7/2010 | Biderman | H04N 7/17318 709/219 |
| 2010/0238924 A1* | 9/2010 | Liu | G06Q 10/087 370/390 |
| 2010/0322196 A1* | 12/2010 | Cherian | H04L 12/1877 370/332 |
| 2011/0252337 A1* | 10/2011 | Pignataro | H04L 41/0266 715/748 |
| 2011/0296475 A1 | 12/2011 | Craner | |
| 2012/0137319 A1* | 5/2012 | Schooling | H04H 20/40 725/16 |
| 2013/0018632 A1* | 1/2013 | Field | H04L 67/025 702/183 |
| 2013/0024582 A1* | 1/2013 | Rodrigues | H04L 12/5601 709/231 |

FOREIGN PATENT DOCUMENTS

| | | |
|---|---|---|
| JP | 2005276079 A | 10/2005 |
| JP | 2008311947 A | 12/2008 |
| JP | 2009542117 A | 11/2009 |
| WO | 0124474 A1 | 4/2001 |
| WO | 0199370 A2 | 12/2001 |
| WO | 2007149821 A2 | 12/2007 |

OTHER PUBLICATIONS

Wikipedia. Thrashing (computer science). Web. Retrieved Aug. 2, 2014.<http://en.wikipedia.org/wiki/Thrashing_computer_science, pp. 1-4.
Wikipedia. Data remanence. Web. Retrieved Aug. 2, 2014. <http://en.wikipedia.org/wiki/Data_remanence>, pp. 1-10.
Savage, John E. Models of Computation: Exploring the Power of Computing. Chapter 3: Machines with Memory. Brown University. Jul. 23, 2008, pp. 91-152.
Wang Jue. Generating Random Terms in Beta Normal Form of the Simply-Typed Lambda Calculus. Boston University. Jul. 10, 2005, pp. 1-13.
Wikipedia. Sector editor. Web. Retrieved Aug. 2, 2014. <http://en.wikipedia.org/wiki/Sector_editor>, pp. 1-3.
Copeland, B. Jack, "The Church-Turing Thesis", The Stanford Encyclopedia of Philosophy (Fall 2008 Edition), Edward N. Zalta (ed.), <http://plato.stanford.edu/archives/fall2008/entries/church-turing/>, pp. 1-14.
Church, A. 'An Unsolvable Problem of Elementary Number Theory'. American Journal of Mathematics, 58, Apr. 1936, pp. 345-363.
Turing, A.M. 'On Computable Numbers, with an Application to the Entscheidungsproblem'. Proceedings of the London Mathematical Society, series 2, 42 (1936-37), pp. 230-265.
Anenbaum, Andrew. Modern Operating Systems. 2d Ed. Prentice Hall. New Jersey. 2001. pp. 379-452.
Wikipedia. Computer forensics. Web. Retrieved Aug. 2, 2014. <http://en.wikipedia.org/wiki/Computer_forensics>, pp. 1-8.
Wikipedia. Data recovery. Web. Retrieved Aug. 2, 2014. <http://en.wikipedia.org/wiki/Data_recovery>, pp. 1-6.
Breakpoint Software, Hex Workshop: Features. Web. Retrieved Aug. 2, 2014. <http://www.hexworkshop.com/features.html>, pp. 1-6.
Wikipedia. Disk editor. Web. Retrieved Aug. 2, 2014. <http://en.wikipedia.org/wiki/Disk_editor>, pp. 1-2.

* cited by examiner

STREAMING WITH OPTIONAL BROADCAST DELIVERY OF DATA SEGMENTS

RELATED APPLICATIONS

The present application is a continuation of U.S. patent application Ser. No. 13/500,594, which was filed on Jul. 9, 2012, which is a national stage application of PCT/EP2009/064553, filed Nov. 3, 2009, the disclosures of each of which are incorporated herein by reference in their entirety.

TECHNICAL FIELD

The present invention relates to techniques for streaming with optional broadcast delivery of data segments.

BACKGROUND

For the purpose of delivering data to a client, it is known to use the approach of streaming data. Typically, the streamed data include media data such as audio data and/or video data.

In this connection, it is known to use a file streaming approach, according to which data segments of a stream are delivered to a client using unicast requests and responses. Here, the data segments may be files including the media data, e.g. in the form of MPEG-TS packets (MPEG: Moving Picture Experts Group, TS: Transport Stream). The data segments may also have the form of individual media files including the media data, e.g. 3 gp files as defined in the 3GPP Technical Specification 26.244 or of MP4 files as defined in ISO/IEC 14496-12 and -14. For example, the stream may correspond to a movie of about one hour total playing time and the data segments may be media files corresponding to consecutive portions of the movie, which each have about a few seconds playing time.

In the file streaming approach, a descriptive file is provided which comprises a list of delivery source identifiers for unicast delivery of the data segments. An example of such a descriptive file is the playlist file according to the HTTP Live Streaming protocol (HTTP: Hypertext Transfer Protocol). In this case, the delivery source identifiers are provided in the form of URIs (Uniform Resource Identifiers).

When applying the file streaming approach in a mobile communication network, there will typically be a plurality of streaming clients in different mobile terminals which continuously request and receive the data segments, which in turn may result in a significant usage of network resources, e.g. available bandwidth for communication between network devices or for communication between network devices and mobile terminals.

Accordingly, there is a need for techniques which allow for an efficient use of network resources when streaming data in a mobile communication network.

SUMMARY

According to an embodiment of the invention, a method of streaming data in a mobile communication network is provided. The method comprises providing a descriptive file of a stream. The descriptive file comprises a list of delivery source identifiers for unicast delivery of data segments of the stream. According to the method, a broadcast indicator is added to the descriptive file to indicate whether broadcast delivery of the data segments is available.

According to an embodiment of the invention, a popularity value of the stream is determined, e.g. by a popularity estimator function which may be implemented in a server providing the data segments and/or the descriptive file or in a proxy server providing temporarily stored copies of the data segments and/or of the descriptive file. On the basis of the popularity value, the broadcast delivery may be initiated and the broadcast indicator added to the descriptive file so as to indicate that the broadcast delivery is available. For example, the popularity value may be compared to a first threshold value and to a second threshold value. If the popularity value is above the first threshold value, the broadcast delivery may be initiated and the broadcast indicator may be provided in the descriptive file to indicate that the broadcast delivery is available. If the popularity value is below the second threshold value, the broadcast delivery may be ended and the broadcast indicator may be provided to indicate that the broadcast delivery is not available, e.g. by modifying the broadcast indicator or removing the broadcast indicator from the descriptive file.

According to a further embodiment of the invention, a method of receiving streamed data in a mobile terminal is provided. The method comprises receiving a descriptive file of a stream. The descriptive file comprises a list of delivery source identifiers for unicast delivery of data segments of the stream. In addition, the descriptive file comprises a broadcast indicator to indicate whether broadcast delivery of the data segments is available. According to the method, it is determined on the basis of the broadcast indicator whether said broadcast delivery is available. If the broadcast delivery is available, the data segments are received using the broadcast delivery.

Further embodiments of the invention relate to network components or mobile terminals operating in accordance with the above methods.

DETAILED DESCRIPTION OF EMBODIMENTS

In the following the invention will be explained in more detail by referring to exemplary embodiments and to the accompanying drawings. The illustrated embodiments relate to techniques for streaming data in a mobile communication network, e.g. a mobile communication network according to the 3GPP (3$^{rd}$ Generation Partnership Project) technical specifications. However, it is to be understood that the concepts as described herein may also be applied to other types of mobile communication networks, e.g. WLAN networks (WLAN: Wireless Local Area Network).

Figure 1:
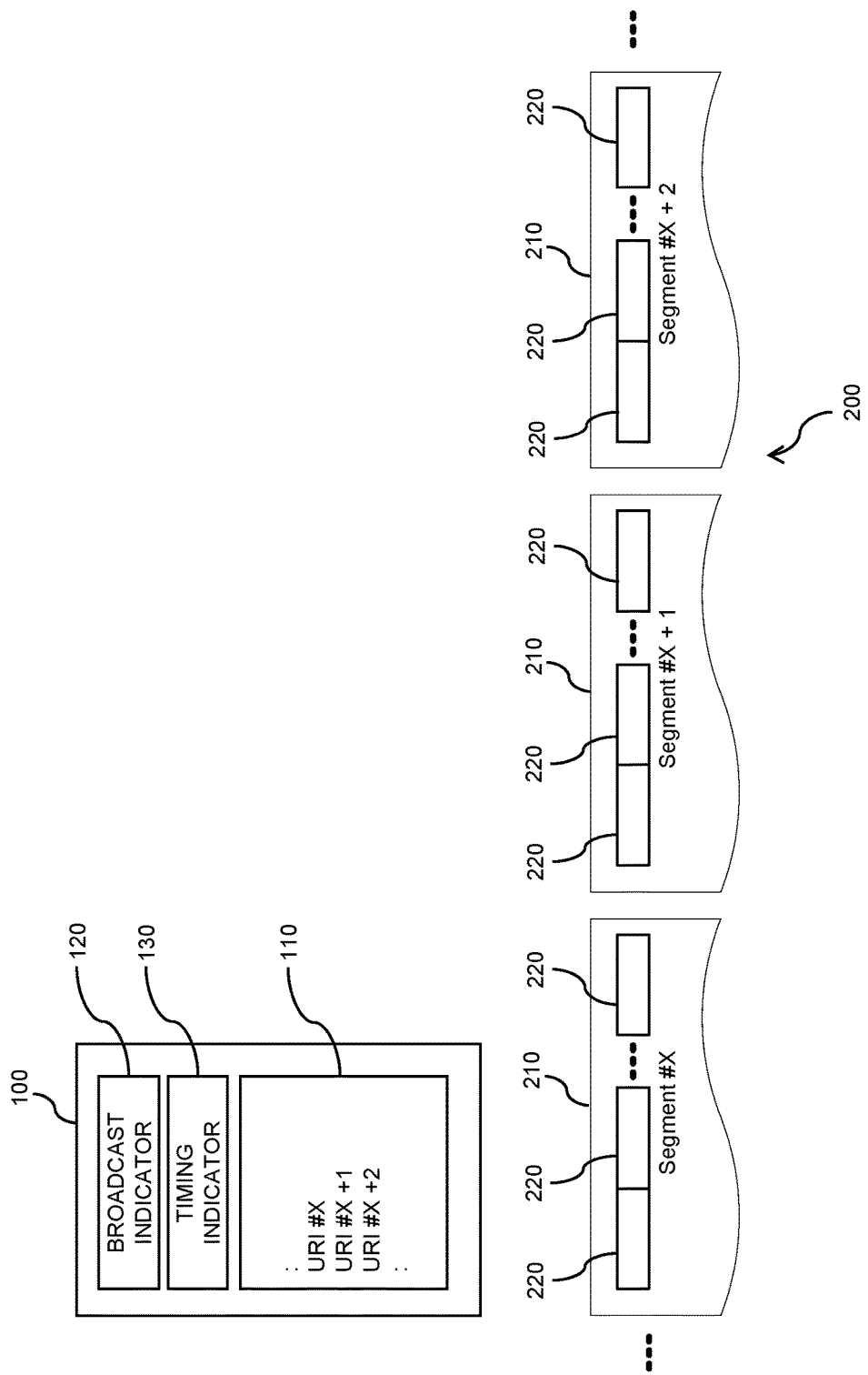
FIG. 1 schematically illustrates the structure of a segmented stream and a descriptive file of the stream.

FIG. 1 schematically illustrates the structure of a segmented stream 200 as used according to an embodiment of the invention. Further, FIG. 1 also illustrates to the structure of a descriptive file 100 in accordance with an embodiment of the invention.

As illustrated, the stream 200 comprises a plurality of data segments 210. The data segments are ordered so as to be played out one after the other by a streaming client. According to the idea of streaming, the data segments 210 are played out in a continuous manner, i.e. without a gap between two of the data segments 210. In the example of FIG. 1, the ordering is indicated by segment numbers #X, #X+1, and #X+2. In accordance with the given order, the data segment with the number #X+1 will be played out after the data segment with the number #X, and the data segment with the number #X+2 will be played out after the data segment with the number #X+1.

The data segments 210 each comprise media data, e.g. audio data and/or video data. In the illustrated example, the media data are indicated by media frames 220, e.g. audio frames or video frames. As illustrated, each of the data segments 210 may comprise a plurality of the media frames 220. According to an embodiment, the media frames 220 are MPEG-TS packets. According to other embodiments, the data segments 210 may be individual media files, e.g. in the form of 3 gp files as defined in the 3GPP Technical Specification 26.244 or in the form of MP4 files as defined in ISO/IEC 14496-12 and -14.

Each of the data segments 210 may correspond to a giving playing time of the media data, e.g. of about 10 s. The total playing time of the stream 200 may be significantly longer, e.g. between a few minutes and several hours.

The descriptive file 100 comprises a list 110 of delivery source identifiers for unicast delivery of the data segments 210. Using the delivery source identifiers in the list 110, the data segments 210 of the stream 200 can be retrieved using a request/response mechanism. For example, a streaming client may send a HTTP request with the delivery source identifier and, in response to the request, receive the data segment 210 corresponding to this delivery source identifier. According to an embodiment of the invention, the delivery source identifiers have the form of URIs or of URLs (Uniform Resource Locators). According to other embodiments, other types of delivery source identifiers and/or other protocols than HTTP may be used.

Depending on the implementation of streaming, different formats may be used for the descriptive file 100. Exemplary formats of the descriptive file 100 are the playlist file as defined for the HTTP Live Streaming protocol. Depending on the implementation of streaming, the descriptive file 100 may also be referred to as a playlist file, an index file or a manifest file.

As further illustrated, the descriptive file 100 is additionally provided with a broadcast indicator 120. Further, a timing indicator 130 may additionally be provided in the descriptive file 100.

The broadcast indicator 120 can be selectively added to the descriptive file 100 so as to indicate whether broadcast delivery of the stream 200 is available. The broadcast indicator 120 may also indicate different delivery alternatives of the stream 200. For example, a first delivery alternative may be unicast delivery, a second delivery alternative may be both unicast delivery and broadcast delivery, and a third delivery alternative may be broadcast delivery only. However, for the purposes of the following description it will be assumed that unicast delivery of the data segments 210 is always available and that the broadcast indicator 120 indicates whether broadcast delivery is available in addition to unicast delivery. Moreover, it will be assumed that the broadcast indicator 120 also includes access information for the broadcast delivery, e.g. an identifier of a broadcast channel and/or parameters needed to receive the broadcast channel such as a port number or a multicast address.

As compared to unicast delivery, in which a streaming client requests one of the data segments 210 and receives the requested data segment 210 in response to the request, the broadcast delivery involves sending the same data segment 210 simultaneously to a plurality of streaming clients. The broadcast delivery may be established using a broadcast channel which can be received by a plurality of mobile terminals and which is used to transmit the data segments 210. In addition, also updated versions of the descriptive file 100 may be transmitted on the broadcast channel.

Different options are available for implementing the broadcast delivery. For example, a broadcast channel may be realized using the FLUTE protocol (FLUTE: File Delivery over Unidirectional Transport) as defined in RFC 3926 or using IP multicast (IP: Internet Protocol). For establishing the broadcast channel in a mobile communication network according to the 3GPP Technical Specifications, multicast or broadcast modes of Multimedia Broadcast and Multicast services (MBMS) as defined in the 3GPP technical specifications may be used to establish the broadcast channel.

As mentioned above, the descriptive file 100 may optionally also comprise a timing indicator 130. The timing indicator 130 may be used so as to indicate a time interval after which the streaming client should request an updated version of the descriptive file 100. In addition or as an alternative, a time interval may be indicated after which the streaming client should use unicast delivery to retrieve one or more of the data segments 210, which could not be successfully received using the broadcast delivery. As will be further explained below, this may be used to force the streaming client to maintain a minimum activity with respect to unicast accesses to the stream 200. The unicast accesses may then be used to estimate or monitor a popularity value of the stream 200.

Figure 2:
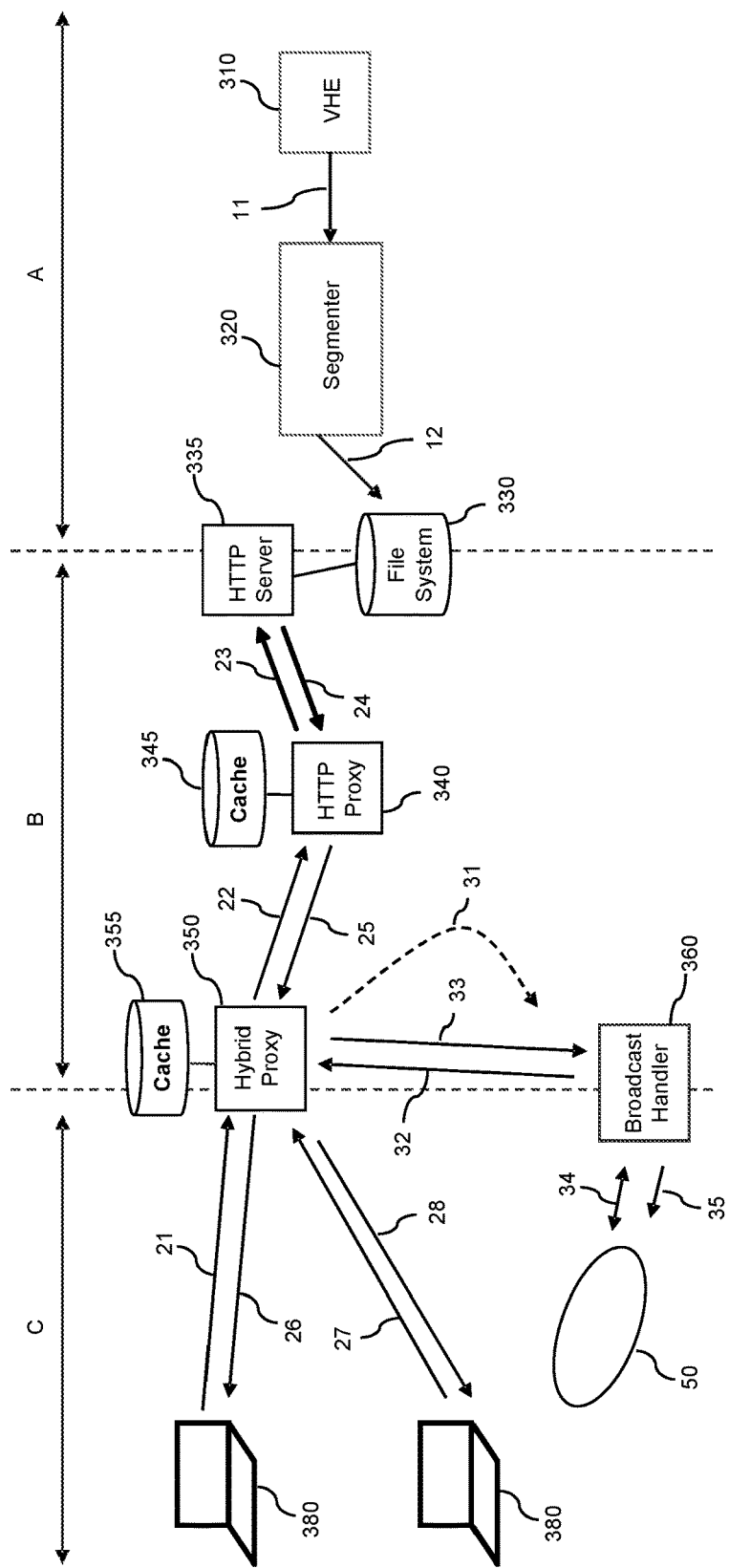
FIG. 2 schematically illustrates a mobile communication network environment in which concepts according to embodiments of the present application may be applied.

FIG. 2 schematically illustrates a mobile communication network environment in which concepts according to embodiments of the present invention may be applied.

As illustrated, the mobile communication network environment comprises a content upload section, denoted by A, a content retrieval section, denoted by B, and a managed content delivery section, denoted by C.

In the content upload section, a video head end (VHE) system 310 produces a continuous media stream 11, which may comprise video data and/or audio data. The continuous media stream 11 is fed into a segmenter 320. The segmenter 320 segments the continuous media stream 11 into data segments corresponding to approximately the same playing time, e.g. about 10 s. The data segments may correspond to those as described in connection with FIG. 1. As indicated by reference numeral 12, the segmenter 320 then accomplishes an upload of the data segments to a file system 330 of a HTTP server 335. The segmenter 320 also generates a descriptive file for the stream, which may correspond to that as described in connection with FIG. 1, but typically does not yet comprise the broadcast indicator 120 or the timing indicator 130. The descriptive file comprises a list of delivery source identifiers for unicast delivery of the data segments of the stream, e.g. in the form of URIs.

According to one option, the stream is open and new data segments are made available by the segmenter 320 as they are generated from the continuous media stream 11. In this case, the descriptive file may be updated each time a new data segment becomes available. According to another option, the stream may be closed and no further data segments of the stream are generated by the segmenter 320. In this case, the segmenter 320 does not need to provide updated versions of the descriptive file. This may be indicated in the descriptive file by a corresponding indicator, e.g. a "#EXT-X-ENDLIST" key as described for the HTTP Live Streaming Protocol. If no such indicator is included in the descriptive file, a streaming client will try to receive updated versions of the descriptive file so as to know the delivery source identifiers of new data segments. In this connection, it is to be noted that the updated version of the descriptive file will typically include new information. However, the updated version may also be unmodified, e.g. to indicate that the previous version of the descriptive file is still valid.

The content retrieval section B comprises a HTTP proxy server 340 with a cache 345. In addition, the content retrieval section B comprises a hybrid proxy server 350 with a cache 345 and a broadcast handler 360.

The managed content delivery section comprises mobile terminals 380 communicating with the hybrid proxy server 350. In addition, the mobile terminals 380 may communicate with the broadcast handler 360 via a broadcast channel 50.

In the mobile communication network environment as illustrated in FIG. 2, content retrieval and managed content delivery works as follows: A streaming client in one of the mobile terminals 380 knows about a stream and sends a request 21 for the descriptive file of the stream to the hybrid proxy server 350. If the requested descriptive file is not available in the cache 355 of the hybrid proxy server 350, the hybrid proxy server 350 sends a request 22 for the descriptive file to the HTTP proxy server 340. If the requested descriptive file is not available in the cache 345 of the HTTP proxy server 340, the HTTP proxy server 340 sends a request 23 for the descriptive file to the HTTP server 335. The HTTP server 335 retrieves the requested descriptive file from the file system 330 and sends a response 24 with the requested descriptive file to the HTTP proxy server 340, which stores a copy of the received descriptive file in the cache 345. In addition, the HTTP proxy server 340 sends a response 25 with the descriptive file to the hybrid proxy server 350. The hybrid proxy server 350 stores a copy of the descriptive file in the cache 355. In addition, the hybrid proxy server 350 sends a response 26 with the descriptive file to the streaming client of the mobile terminal 380. If there is another request 27 for the descriptive file, e.g. from a streaming client in another one of the mobile terminals 380, a copy of the descriptive file is already available in the cache 355, and the hybrid proxy server 350 then sends a response 28 with a copy of the descriptive file as stored in the cache 355.

The process of requesting other content, e.g. data segments of the stream, is similar. A streaming client of one of the mobile terminals 380 sends a request 21 for a data segment to the hybrid proxy server 350. If a copy of the requested data segment is not available in the cache 355, the hybrid proxy server 350 sends a request 22 for the data segment to the HTTP proxy server 340. If a copy of the request data segment is not available in the cache 345, the HTTP proxy server 340 sends a request 23 for the data segment to the HTTP server 335. The HTTP server 335 retrieves the requested data segment from the file system and sends a response 24 with the requested data segment to the HTTP proxy server 340. The HTTP proxy server 340 stores a copy of the requested data segment in the cache 345. In addition, the HTTP proxy server 340 sends a response with the requested data segment to the hybrid proxy server 350. The hybrid proxy server 350 stores a copy of a requested data segment in the cache 355 and sends a response 26 to the streaming client of the mobile terminal 380. If there is another request 27 for this data segment, i.e. from another one of the mobile terminals 380, a copy of the requested data segment is already available in the cache 355, and the hybrid proxy server 350 sends a response with the copy of the requested data segment to the streaming client of the mobile terminal 380.

If a copy of the requested content, e.g. the descriptive file or the data segment, is not available in the cache 355, but in the cache 345, the request is answered with the copy as stored in the cache 345.

Accordingly, the illustrated caching hierarchy allows for responding to a request for a specific content, i.e. the descriptive file of the stream or a data segment of the stream, with a copy of the requested content which is stored in the cache 355 or in the cache 345. It is to be understood that other caching hierarchies may be used as well, e.g. a caching hierarchy using only the hybrid proxy server 350 or a caching hierarchy using a larger number of HTTP proxy servers. The copies stored by the cache 355 and by the cache 345 may be provided with a validity time information so as to ensure that the content is newly requested after a given time. In this way, updated versions of the content will be stored in the caches 355, 345. For example, copies of the descriptive file of the stream as stored in the cache 355 or in the cache 345 may be replaced with copies of an updated version of the descriptive file.

Accordingly, the illustrated caching hierarchy may keep copies of content, e.g. the descriptive file of the stream or data segments of the data segments of the stream, for a certain time and thereby move content closer to the mobile terminals 380. In this way, data traffic between components of the mobile communication network may be reduced.

It is to be understood that the structure of the mobile communication network environment as illustrated in FIG. 2 is merely exemplary and that concepts according to embodiments of the present invention may also be applied using a different structure of the mobile communication network environment. For example, the HTTP proxy server 340 and the cache 345 could be committed and the hybrid proxy server 350 could communicate directly with the HTTP server 335. Moreover, the hybrid proxy server 350 and the cache 355 could be omitted as well and the mobile terminals 380 and the broadcast handler 360 could communicate directly with the HTTP server 335.

According to an embodiment of the invention, the hybrid proxy server 350 is configured to determine a popularity value of the stream. For this purpose, the hybrid proxy server 350 comprises a correspondingly configured device or module (not illustrated in FIG. 2), which will be referred to as a popularity estimator. On the basis of the popularity value, broadcast delivery of the stream is initiated by sending a triggering signal 31 to the broadcast handler 360. In addition, the hybrid proxy server 350 adds the broadcast indicator to the descriptive file so as to indicate that broadcast delivery of the stream is now available.

According to an embodiment, the broadcast handler 360 sends requests 32 for content related to the stream to the hybrid proxy server 350. In particular, the broadcast handler 360 may request the data segments of the stream. In addition, the broadcast handler 360 may also request the descriptive file of the stream. The hybrid proxy server 350 sends responses 33 to the broadcast handler 360, which include the requested content, i.e. the data segments of the stream and optionally also the descriptive file of the stream. The requests 32 and the responses 33 may be exchanged between the broadcast handler 360 and the hybrid proxy server 350 in a similar manner as between one of the mobile terminals 380 and the hybrid proxy server 350, e.g. using a request/response mechanism. That is to say, with respect to the hybrid proxy server 350, 360 the broadcast handler 360 may act in a similar manner as a streaming client of the mobile terminals 380. According to other embodiments, the broadcast handler 360 may use other mechanisms to retrieve the data segments and/or the descriptive file for distribution via the broadcast channel 50. For example, the hybrid proxy server 350 may actively send the data segments or the descriptive file to the broadcast handler 360, without requiring any request from the broadcast handler 360, which may also be referred to as a push mechanism. Moreover, the broadcast handler 360 may also receive the data segments and/or the descriptive file from other sources, e.g. from the HTTP proxy server 340 or from the HTTP server 335.

The broadcast handler 360 then distributes the content simultaneously to a plurality of the mobile terminals 380 using the broadcast channel 50.

If broadcast delivery is initiated for the stream, at least the data segments of the stream are distributed by the broadcast handler 360 to a plurality of the mobile terminals 380. According to some embodiments, the descriptive file of stream may be distributed using the broadcast delivery as well. In this case, updated versions of the descriptive file would be distributed on the broadcast channel at regular time intervals or as soon as they are available.

With the above functionality of the hybrid proxy server 350, if one of the mobile terminals 380 wants to receive the stream, it first requests the descriptive file of the stream from the hybrid proxy server 350. The hybrid proxy server 350 responds with a cached copy of the descriptive file or makes a request to receive the descriptive file from the HTTP proxy server 340 or from the HTTP server 335.

On the basis of the popularity value of the stream, the broadcast indicator is selectively added to the descriptive file. For example, if the popularity value is above a first threshold value, the broadcast indicator may be added to the descriptive file so as to indicate that broadcast delivery is available and broadcast delivery may be initiated. If the popularity value is below a second threshold value, the broadcast indicator may be modified or removed so as to indicate that the broadcast delivery is no longer available and the broadcast delivery may be ended. Initiating and ending the broadcast delivery may be achieved using the triggering signal 31. According to an embodiment, the first threshold value is higher than the second threshold value. In this way, frequent initiating and ending of the broadcast delivery due to the popularity value being close to one of the threshold values can be avoided. In the illustrated embodiment, the above processes of selectively adding the broadcast indicator and initiating or ending the broadcast delivery are accomplished by the popularity estimator of the hybrid proxy server 350. The threshold values may be configured by an operator of the mobile communication network so as to balance resources required to provide the unicast delivery and resources required to provide the broadcast delivery.

The streaming client of the mobile terminal 380 receives the descriptive file and determines on the basis of the broadcast indicator in the descriptive file whether the broadcast delivery is available. For example, the broadcast indicator being present in the descriptive file may indicate that the broadcast delivery is available, whereas the broadcast indicator not being present in the descriptive file may indicate that the broadcast delivery is not available. Another example is to have one type of broadcast indicator which indicates that the broadcast delivery is available and another type of broadcast indicator which indicates that the broadcast delivery is not available.

If the broadcast delivery is available, the streaming client of the mobile terminal 380 then uses the broadcast delivery to receive the data segments of the stream. If broadcast delivery is not available, the streaming client of the mobile terminal uses the unicast delivery to receive the data segments of the stream. That is to say, the data segments are requested using the delivery source indicators for unicast delivery as included in the descriptive file. Further, the streaming client may also use unicast delivery to receive one of the data segments if broadcast delivery of this data segment fails, e.g. due to a disturbance on the broadcast channel 50.

As mentioned above, the descriptive file of the stream may be included in the broadcast delivery as well. Accordingly, the streaming client of the mobile terminal 380 may receive an updated version of the descriptive file using the broadcast delivery. The updated version of the descriptive file may include newly added delivery resource identifiers or may also be modified with respect to the broadcast identifier. For example, the broadcast delivery of the data segments may end with an updated version of the descriptive file of the stream, which is modified with respect to the broadcast indicator so as to indicate that broadcast delivery is no longer available. Upon receiving the updated version of the descriptive file, the streaming client of the mobile terminal 380 will determine that broadcast delivery is no longer available and then use unicast delivery to request and receive the data segments or updated versions of the descriptive file. Again, it is to be understood that an updated version of the descriptive file may also be substantially unmodified with respect to the previous version, e.g. to indicate that the previous version is still valid.

As mentioned above, according to some embodiments of the invention, initiating the broadcast delivery or ending the broadcast delivery is decided on the basis of the popularity value of the stream. Different options are available for determining the popularity value:

According to a first option, the popularity value may be set by an operator of the mobile communication network or by a content provider of the stream. That is to say, a high popularity value may be manually assigned to the stream if the stream is expected to be received by a large number of mobile terminals. A low popularity value may be manually assigned to a stream if the stream is expected to be received by only few mobile terminals. Accordingly, the popularity estimator may be configured to receive or obtain the popularity value as a given parameter of the stream.

According to a second option, the popularity estimator may be configured to determine the popularity value in a dynamic manner, e.g. on the basis of a number of requests for content related to the stream. For example, the popularity value may be determined on the basis of a number of requests for the descriptive file of the stream. Further, the popularity value may be determined on the basis of a number of requests for unicast delivery of one or more of the data segments of the stream. The popularity value may also be determined on the basis of a combination of the number of requests for the descriptive file and the number of requests for unicast delivery of one or more of the data segments. The popularity value may be based on an absolute number of requests or on a relative number of requests in a given time interval.

In some situations, e.g. if the stream is closed and no new delivery source identifiers for unicast delivery are being added to the descriptive file any more or if broadcast delivery is used to distribute updates of the descriptive file, accuracy of determining the popularity value can be improved by enforcing a certain minimum activity of the streaming client with respect to requesting the descriptive file. This can be achieved by temporarily suppressing the broadcast delivery of the descriptive file or by configuring the streaming client to request an updated version of the descriptive file if no updated version of the descriptive file has been received for a given time. This given time can be preconfigured in the streaming client or can be selected depending on a parameter of the stream, e.g. depending on the playing time of one data segment. Further, the time after which the streaming client should request an updated version of the descriptive file could also be configured from the network using a timing indicator included in the descriptive file, e.g. the timing indicator 130 as described in connection with FIG. 1. The streaming client may be implemented with a timer so as to monitor whether the given time has lapsed. In addition or as an alternative, a certain minimum activity of the streaming client with respect to requesting the descriptive file can also be enforced by modifying the descriptive file of a closed stream. For example, the indicator indicating that the stream is closed may be removed from the descriptive file. In addition, some of the delivery source identifiers may be removed from the list of the descriptive file.

If the popularity value is determined on the basis of a number of requests for unicast delivery of one or more of the data segments of the stream, an improved accuracy of the popularity value can be obtained by suppressing the broadcast delivery of this data segment. In this way, the streaming client will be forced to make a request for unicast delivery of the data segment even if the stream is otherwise received using the broadcast delivery, which causes a certain minimum activity of the streaming client with respect to making requests for unicast delivery of one or more of the data segments.

Accordingly, by enforcing a certain activity of the streaming client with respect to making requests for the descriptive file or for unicast delivery of one of the data segments, the popularity value can be accurately monitored even if broadcast delivery is used to distribute the data segments and updated versions of the descriptive file.

Figure 3:
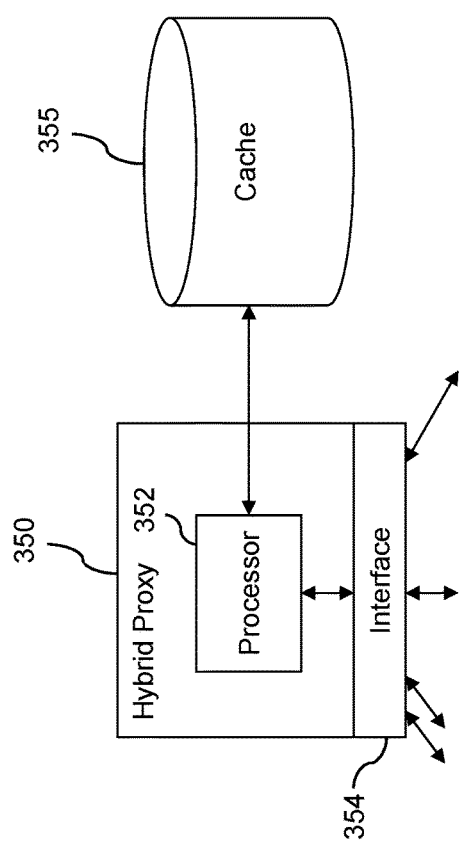
FIG. 3 schematically illustrates a network component according to an embodiment of the invention.

FIG. 3 schematically illustrates further details of the hybrid proxy server 350. As illustrated in FIG. 3, the hybrid proxy server 350 comprises a processor 352, the popularity estimator 353, and an interface 354. The processor 352 is coupled to the cache 355 and to the interface 354. The popularity estimator 353 may be implemented by suitably configured program code, which is executed by the processor 352. The interface 354 is configured to receive requests from mobile terminals 380 or from other network components. In addition, the interface 354 is configured to send responses to the mobile terminals 380 or to other network components. For example, the interface 354 may be used to receive requests for unicast delivery of data segments from one of the mobile terminals 380 and to send responses with requested data segments to the mobile terminal 380. Further, the interface 354 may be used to receive requests for the descriptive file of the stream from one of the mobile terminals 380 and to send responses including the descriptive file to the mobile terminal. Moreover, the interface 354 may be used to receive requests for data segments of a stream from a broadcast handler 360 as described in connection with FIG. 2 and to send responses with requested data segments to the broadcast handler 360. Similarly, the interface 354 may also be used to receive requests for the descriptive file of the stream from the broadcast handler and to send responses including the requested descriptive file to the broadcast handler 360. The interface 354 may also be used to send requests for the descriptive file of the stream or for data segments of the stream to other network components and to receive responses including the requested content, i.e. the descriptive file or the data segment, from the network component. Such network components may be the HTTP proxy server 340 or the HTTP server 335.

The processor 352 may be a multi-purpose processor which is configured to accomplish the above-mentioned functionalities of the hybrid proxy server 350 by executing suitably configured program code.

Figure 4:
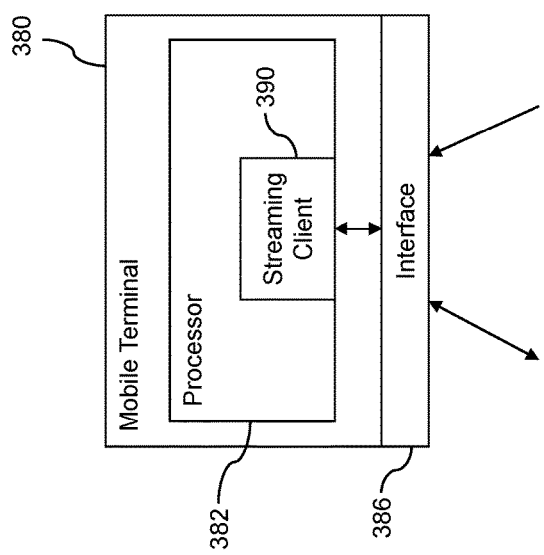
FIG. 4 schematically illustrates a mobile terminal according to an embodiment of the invention.

FIG. 4 schematically illustrates a mobile terminal according to an embodiment of the invention, i.e. one of the mobile terminals 380 as illustrated in FIG. 2. The mobile terminal 380 may be a mobile phone, a portable computer, media player, or other type of portable communication equipment. As illustrated, the mobile terminal 380 comprises a processor 382 and an interface 386. The processor implements functionalities of a streaming client 390 by executing suitably configured program code. The streaming client 390 is configured to handle the reception of streams in the above-described manner, i.e. selectively uses broadcast delivery to receive data segments of the stream if broadcast delivery is indicated to be available in the descriptive file of the stream.

The interface 386 is configured to send requests for the descriptive file of the stream or for unicast delivery of data segments of the stream and to receive responses including the requested content, i.e. the requested descriptive file or data segment. In addition, the interface 386 is configured to receive data segments of the stream from a broadcast channel. The interface 386 may also be used to receive the descriptive file of the stream from the broadcast channel.

The interface 386 may be a wireless interface in accordance with the mobile communication network in which the mobile terminal 380 is to be used, i.e. a GSM interface or a UMTS interface (GSM: Global System for Mobile Communications, UMTS: Universal Mobile Telecommunication System).

It is to be understood that the mobile terminal 380 may comprise further components which have not been illustrated. Such components may be, e.g., a buffer for temporarily storing the received data segments before being played out or an assembler for ordering and concatenating the received data segments so as to be played out in a continuous manner.

Figure 5:
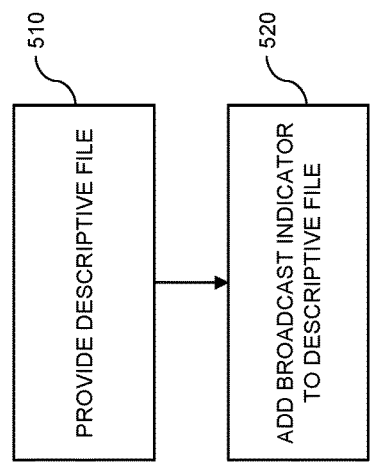
FIG. 5 shows a flow-chart for illustrating a method of streaming data according to an embodiment of the invention.

FIG. 5 shows a flowchart for schematically illustrating a method of streaming data according to an embodiment of the invention. The method may be applied in a mobile communication environment as illustrated in FIG. 2, e.g. in the hybrid proxy server 350. However, the method may also be applied in other network components, e.g. in the HTTP server 335.

In step 510, a descriptive file of a stream is provided. The stream and the descriptive file may be configured as explained in connection with FIG. 1. The descriptive file comprises a list of delivery source identifiers for unicast delivery of data segments of the stream. As explained in connection with FIG. 1, the delivery source identifiers may be URIs. Using the delivery source identifiers may be received using a request-response mechanism. According to an embodiment of the invention, the descriptive file may correspond to a playlist file in accordance with the HTTP live streaming protocol. According to other embodiments other formats may be used for the descriptive file.

In step 520, a broadcast indicator is added to the descriptive file to indicate whether broadcast delivery of the data segments is available, e.g. the broadcast indicator 120 as described in connection with FIG. 1. The broadcast indicator may indicate different delivery alternatives of the stream, e.g. the unicast delivery only, both the unicast delivery and the broadcast delivery, or the broadcast delivery only. Again, the term "broadcast delivery" refers to a type of delivery in which the same content is simultaneously delivered to a plurality of recipients.

The broadcast indicator may be added to the descriptive file on the basis of a popularity value of the stream. This process may involve comparison of the popularity value to a first threshold value and to a second threshold value. If the popularity value is above the first threshold value, the broadcast delivery may be initiated and the broadcast indicator may be provided to indicate that the broadcast delivery is available. If the popularity value is below the second threshold value, ongoing broadcast delivery of the stream may be ended and the broadcast indicator removed or modified to indicate that the broadcast delivery is no longer available. According to an embodiment of the invention, the popularity value may be determined on the basis of a number of requests for the descriptive file and/or on the basis of a number of requests for the unicast delivery of one or more of the data segments.

When the broadcast indicator is added to the descriptive file, the broadcast delivery may be initiated, e.g. by sending a triggering signal to a broadcast handler as explained above.

Figure 6:
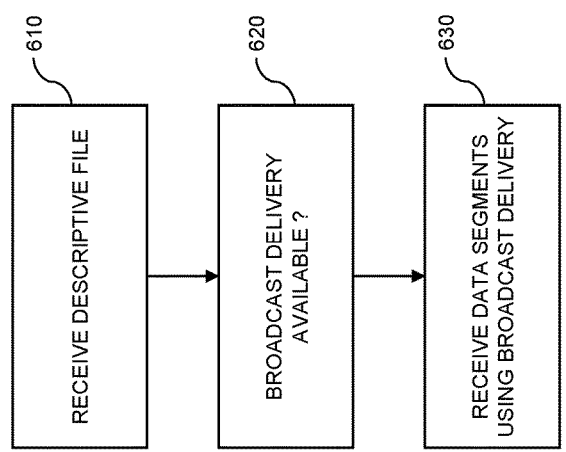
FIG. 6 shows a flow-chart for illustrating a method of receiving streamed data according to a further embodiment of the invention.

FIG. 6 shows a flowchart for schematically illustrating a method of receiving streamed data according to an embodiment of the invention. The method may be applied in the streaming client of one of the mobile terminals 380 as illustrated in FIG. 2.

In step 610, a descriptive file of a stream is received, e.g. a descriptive file as described in connection with FIG. 1. The descriptive file comprises a list of delivery source identifiers for unicast delivery of data segments of the stream. For example, the descriptive file may be a playlist file in accordance with the HTTP live streaming protocol. As an additional item, the descriptive file comprises a broadcast indicator to indicate whether broadcast delivery of the data segments is available, e.g. a broadcast indicator as described in connection with FIG. 1.

In step 620, the broadcast indicator is used to determine whether the broadcast delivery is available.

In step 630, if the broadcast delivery is available, the data segments of the stream are received using the broadcast delivery. If the broadcast delivery is not available, the data segments may be received using the unicast delivery and the delivery source identifiers as included in the list of the descriptive file. Further, if broadcast delivery of one of the data segment fails, unicast delivery of this data segment may be requested as well. Broadcast delivery of the data segment may be regarded as having failed, if the data segment has not been received at a given point of time, which may be defined with respect to reception of the previous data segment of the list of delivery source identifiers or with respect to an intended playout time of the data segment. In the streaming client, a timer may be provided for the purpose of monitoring this given point of time. Corresponding information may be transmitted to the streaming client on a per-stream basis using the timing indicator 130 as described in connection with FIG. 1 or may be preconfigured in the streaming client.

The methods as illustrated in FIGS. 5 and 6 may be combined with each other. That is to say, the descriptive file with the broadcast indicator as provided by the method of FIG. 5 may be used in the method of FIG. 6.

Several modifications are possible in the embodiments and examples as explained above. For example, different file structures of the descriptive file may be used. Also, different types of segmenting the stream may be used. The data segments may be files including MPEG-TS packets, or may be 3 gp files or MP4 files. In addition, the concepts as explained above may be applied in different types of mobile communication networks. For example, the concepts may also be applied in a WLAN communication network. Also, it is to be understood that monitoring the popularity of a stream, selectively initiating broadcast delivery of a stream, and indicating availability of broadcast delivery in the descriptive file need not be performed by the hybrid proxy server as explained in connection with FIG. 2, but may also be performed by other servers which are used to maintain the descriptive file and/or the data segments, e.g. the HTTP server 335 as shown in FIG. 2. The popularity estimator may also be implemented in other network components than the hybrid proxy server 350, e.g. in the HTTP proxy server 340 or in the HTTP server 335. The popularity estimator may also be implemented in a dedicated network component Further, it is to be understood that other criteria than the popularity value may be used as alternative or in addition when deciding whether broadcast delivery of the stream is to be initiated or ended. Moreover, functionalities of network components as explained above may be integrated in a single network component. For example, the hybrid proxy server 350, the cache 355, and the broadcast handler 360 as illustrated in FIG. 2 could be integrated in a single network component or at least co-located. In addition, it is to be understood that functionalities as explained above could be implemented by software running on a computer system or by dedicated hardware.

The invention claimed is:

1. A method of receiving streamed data in a mobile terminal, comprising:
   receiving a descriptive file of a stream over a broadcast channel, the descriptive file comprising:
      a list of delivery source identifiers for unicast delivery of data segments of the stream; and
      a first broadcast indicator configured to indicate which of a plurality of different delivery options is available for delivery of the data segments, the delivery options comprising:
         unicast-only delivery of the data segments; and
         broadcast-only delivery of the data segments; and
      a second broadcast indicator configured to indicate that broadcast delivery is not available; and
   receiving the data segments over the broadcast channel responsive to determining that broadcast delivery is available.

2. The method of claim 1 wherein the plurality of different delivery options further comprises both unicast and broadcast delivery of the data segments.

3. The method of claim 1 wherein the first and second broadcast indicators are of different broadcast indicator types.

4. The method of claim 1 further comprising using unicast delivery to receive one of the data segments in response to broadcast delivery of that data segment failing.

5. The method of claim 1 further comprising receiving an updated version of the descriptive file using broadcast delivery.

6. The method of claim 1 further comprising using unicast delivery to receive an updated version of the descriptive file if the broadcast delivery of the updated version of the descriptive file fails.

7. The method of claim 1 further comprising sending a request for an updated version of the descriptive file in response to no updated version of the descriptive file being received for a given time.

8. The method of claim 1 wherein the descriptive file is a playlist file according to the HTTP Live Streaming protocol.

9. A mobile terminal for receiving streaming data in a mobile communications network, the mobile terminal comprising:
processing circuitry configured to:
receive a descriptive file of a stream over a broadcast channel, the descriptive file comprising:
a list of delivery source identifiers for unicast delivery of data segments of the stream; and
a first broadcast indicator configured to indicate which of a plurality of different delivery options is available for delivery of the data segments, the delivery options comprising:
unicast-only delivery of the data segments; and
broadcast-only delivery of the data segments; and
a second broadcast indicator configured to indicate that broadcast delivery is not available; and
receive the data segments over the broadcast channel responsive to determining that broadcast delivery is available.

10. The mobile terminal of claim 9 wherein the plurality of different delivery options further comprises both unicast and broadcast delivery of the data segments.

11. The mobile terminal of claim 9 wherein the first and second broadcast indicators are of different broadcast indicator types.

12. The mobile terminal of claim 9 wherein the processing circuitry is further configured to use unicast delivery to receive one of the data segments in response to the broadcast delivery of that data segment failing.

13. The mobile terminal of claim 9 wherein the processing circuitry is further configured to receive an updated version of the descriptive file using broadcast delivery.

14. The mobile terminal of claim 13 wherein the processing circuitry is further configured to use unicast delivery to receive the updated version of the descriptive file if the broadcast delivery of the updated version of the descriptive file fails.

15. The mobile terminal of claim 13 wherein the processing circuitry is further configured to send a request for the updated version of the descriptive file in response to determining that no updated version of the descriptive file has been received for a given time.

16. The mobile terminal of claim 9 wherein the descriptive file comprises a playlist file according to the HTTP Live Streaming protocol.

* * * * *